United States Patent
Topolkaraev et al.

(10) Patent No.: US 6,348,258 B1
(45) Date of Patent: Feb. 19, 2002

(54) BREATHABLE FILM HAVING ORGANIC FILLER

(75) Inventors: Vasily Aramovich Topolkaraev, Appleton, WI (US); Kevin Matthew Harrington, Dunwoody, GA (US); Glynis Allicia Walton; Sandy Chi-Ching Ying, both of Roswell, GA (US); Kevin George Hetzler, Sparta, NJ (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/266,955

(22) Filed: Mar. 12, 1999

Related U.S. Application Data (60) Provisional application No. 60/090,628, filed on Jun. 25, 1998.

(51) Int. Cl.[7] .................................................. B32B 5/22
(52) U.S. Cl. ................ 428/317.9; 524/430; 524/503; 524/505; 524/507; 524/512; 524/513; 524/514; 524/520
(58) Field of Search ............................. 428/317.9, 430; 524/505, 503, 507, 512, 513, 514, 520

(56) References Cited

U.S. PATENT DOCUMENTS

| | | | |
|---|---|---|---|
| 3,565,747 A | 2/1971 | Vincent et al. | 161/162 |
| 4,010,134 A | 3/1977 | Braunisch et al. | 260/29.6 S |
| 4,010,307 A | 3/1977 | Canard et al. | 428/327 |
| 4,347,844 A | 9/1982 | Ohki et al. | 128/287 |
| 4,472,328 A | 9/1984 | Sugimoto et al. | 264/41 |
| 4,528,303 A | 7/1985 | Segaud | 523/212 |
| 4,777,073 A | 10/1988 | Sheth | 428/155 |
| 4,829,096 A | 5/1989 | Kitamura et al. | 521/79 |
| 4,923,650 A | 5/1990 | Antoon, Jr. et al. | 264/41 |
| 5,008,296 A | 4/1991 | Antoon, Jr. et al. | 521/91 |
| 5,055,338 A | 10/1991 | Sheth et al. | 428/155 |
| 5,110,670 A | 5/1992 | Janocha et al. | 428/216 |
| 5,272,236 A | 12/1993 | Lai et al. | 526/348.5 |
| 5,316,843 A | 5/1994 | Kiryu et al. | 428/323 |
| 5,322,728 A | 6/1994 | Davey et al. | 428/296 |
| 5,422,175 A | 6/1995 | Ito et al. | 428/304.4 |
| 5,565,503 A | 10/1996 | Garcia et al. | 523/124 |
| 5,571,619 A | 11/1996 | McAlpin et al. | 428/364 |
| 5,597,522 A | 1/1997 | Curzon et al. | 264/177.16 |

FOREIGN PATENT DOCUMENTS

| | | | |
|---|---|---|---|
| EP | 0 644 226 A1 | 11/1993 | C08J/5/18 |
| EP | 0 657 502 A1 | 12/1993 | C08L/67/02 |

OTHER PUBLICATIONS

Kwang Ung Kim, et al.: Polystyene/Polyethylene Blends Containing Block Copolymers, *Polymer (Korea)*, 40–46, vol. 13, No. 1, Jan. 1989.

R. Fayt, et al.: Molecular Design of Multicomponent Polymer Systems, *Polymer Engineering and Science*, 937–943, vol. 30, No. 16, Aug. 1990.

Chung P. Park, et al.: Compatibilizing PE–PS Blends With Ethylene–Styrnen Copolymers, *Plastics Engineering*, 97–99, Mar. 1997.

(List continued on next page.)

*Primary Examiner*—Peter D. Mulcahy
(74) *Attorney, Agent, or Firm*—Pauley Petersen Kinne & Fejer (57) ABSTRACT

A breathable film having improved processing properties and reduced cost includes a breathable film-forming layer composition including a matrix polymer, a particulate organic filler, and a compatibilizer. The particulate organic filler is incompatible with the matrix polymer and tends to agglomerate when mixed with the matrix polymer alone. The compatibilizer achieves thermodynamic equilibrium between the matrix polymer and filler within a defined filler particle size range suitable for producing stretched breathable film. The film processes more easily than breathable films containing inorganic fillers, and is less expensive to manufacture.

30 Claims, 3 Drawing Sheets

OTHER PUBLICATIONS

D. Ghidoni, et al.: Stabilization of High–Impact Polystyrene/Polyethylene Blends, *Journal of Material Science*, V. 27/n2, 499–503, Jan. 15, 1992.

T. Li, et al.: Block Copolymers as Compatibilizers for Blends of Linear Low Density Polyethylene and Polystyrene, *Collected Papers, Center for Applied Polymer Research*, 11–27, vol. I, 1994–1995.

T. Li, et al.: Failure Mechanisms in Blends of Linear Low–Density Polyethylene and Polystryene, American Chemical Society, *Collected Papers, Center for Applied Polymer Research*, vol. II, 53–78, 1995–1996.

Tao Li, et al.: Failure Mechanisms in Compatibilized Blends of Linear Low–Density Polyethylene and Polystyrene, American Chemical Society, 79–94, 1996.-

BREATHABLE FILM HAVING ORGANIC FILLER

This application claims benefit of Provisional No. 60/090,628 filed Jun. 25, 1998.

FIELD OF THE INVENTION

This invention relates to a breathable film-forming composition having an organic filler which alleviates die build-up during the extrusion of breathable films, and which reduces the cost associated with inorganic fillers. More specifically, the invention is directed to breathable films utilizing polystyrene filler and a compatibilizer system which effectively compatibilizes and disperses the polystyrene filler in the polymer blend used to make the film.

BACKGROUND OF THE INVENTION

Vapor permeable, liquid impermeable polymeric films are known in the art. One method of making a polymeric film vapor permeable, involves mixing a matrix polymer with a substantial quantity (e.g., 10–70% by weight) of an organic or inorganic particulate filler such as, for example, calcium carbonate, and extruding a film from the blend. The matrix polymer may include a polyolefin, such as polyethylene or polypropylene, or various olefin copolymers. The film may be a monolayer film, a multilayer film which contains the filled layer as a primary layer, or a multilayer film having more than one filled layer.

Then, the film is heated and stretched, causing voids to form in the areas surrounding the filler particles. The voided film is characterized by thin polymer membranes and/or fine pore networks which permit the molecular diffusion of water vapor through the film, but which block the passage of liquids. In essence, a tortuous path is created from one film surface to the other which permits transfer of vapors but not liquids.

Breathable films are employed in backsheets, for example as a backsheet component laminated to a nonwoven web and/or other layers, in many of today's personal care absorbent articles. Diapers are one example. Filled, stretched polyolefin films provide good water vapor transmission, making the diapers more comfortable to the wearer. As a result, the relative humidity and temperature within the diaper or other product can be reduced by using breathable films and laminates. Breathable films are also used in surgical gowns. Again, the objective is to provide good water vapor transmission and make the gowns more comfortable to the wearer.

Breathable films are commonly made using inorganic fillers, such as calcium carbonate. Inorganic fillers are relatively easy to disperse in a polyolefin matrix, for instance, and yield films with excellent breathability. Yet calcium carbonate and other inorganic fillers have a disadvantage in that the filler tends to accumulate around the lip of the extrusion die during manufacture of the film. To alleviate this, a center layer filled with calcium carbonate has been coextruded with much thinner layers which contain little or no filler. This approach reduces filler build-up at the die, but often results in a less breathable product because the unfilled skin layers, no matter how thin, are less microporous than the filled core layer. Inorganic fillers are also somewhat expensive, due in part to their high density.

Attempts have been made to make suitable breathable films using organic fillers. Organic fillers can be less expensive to use because they generally have lower densities than inorganic fillers. Organic fillers may also reduce the problem of die build-up. However, organic fillers have a tendency to either agglomerate with each other, or disperse too finely in the polymeric medium upon which the film is based. If the organic filler is incompatible with the polymer used to make the film, the filler particles may agglomerate excessively. If the organic filler is compatible with the film-forming polymer, the filler particles may disperse too finely, and may achieve thermodynamic equilibrium by dissolving in the film. Thus, there is a need or desire for a breathable film whose filler has the advantages provided by an organic filler, and which exhibits a more useful degree of dispersion.

SUMMARY OF THE INVENTION

The present invention is directed to a breathable film composition, and a film, containing an organic filler in a matrix polymer, and a compatibilizing system which effectively disperses the filler in the matrix polymer without causing excessive dispersion or dissolution. The present invention also includes a multilayer breathable film utilizing a conventional inorganic film in the core layer, and an organic filler in the skin layers. The films of the invention reduce the die build-up associated with inorganic fillers, without reducing breathability. The films of the invention also reduce the cost associated with using strictly inorganic fillers.

In accordance with the invention, a composition including a thermoplastic polymer, an organic filler, and a compatibilizing system is provided. The thermoplastic polymer may be a polyolefin. The organic filler is preferably incompatible with the thermoplastic polymer, thereby preventing dissolution or excessive dispersion in the polymer matrix. Put another way, the organic filler particles should have a tendency to agglomerate with each other in the polymer matrix, but for the inclusion of a compatibilizing system. The organic filler should also have a higher melting point than the polymer matrix. When the polymer matrix includes a polyolefin, the organic filler may include polystyrene beads.

The compatibilizing system should have a tendency to prevent agglomeration of the organic filler in the polymer matrix, and/or a tendency to break up existing agglomerates of the organic filler. Yet the compatibilizing system should not break down the organic filler into particles which are too fine to sufficiently effect breathability during preparation of the breathable film. Also, the compatibilizing system should not cause dissolution of the organic filler in the polymer matrix. When the polymer matrix includes a polyolefin, and the filler includes polystyrene particles, the compatibilizing system may include a styrene butadiene copolymer. The styrene butadiene copolymer may be included in the polystyrene filler, and may be either chemically reacted to or blended with the polystyrene in the beads. More desirably, the styrene butadiene copolymer may be incorporated into the polymer matrix without forming part of the beads.

The compatibilizing system should be present in an amount sufficient that the organic filler particles are at thermodynamic equilibrium in the polymer matrix in a dispersed particle phase having a mean particle diameter of about 0.1–25 microns. In other words, the thermodynamic equilibrium should not favor a predominance of large, agglomerated particles, and should not favor dissolution of the filler particles, or excessive dispersion which renders the particles too small to effectively promote breathability in a stretched film.

The composition is melt blended and extruded into a film. The film may be a monolayer or multilayer film. The film is then stretched, monoaxially or biaxially using conventional techniques to yield a breathable microporous film.

With the foregoing in mind, it is a feature and advantage of the invention to provide a breathable film-forming composition including a thermoplastic polymer matrix material, an organic filler, and a compatibilizing system which establishes thermodynamic equilibrium between the polymer matrix material and the organic filler with the organic filler in an effective dispersed particulate state.

It is also a feature and advantage of the invention to provide a breathable film constructed from the breathable film-forming composition of the invention.

It is also a feature and advantage of the invention to provide a breathable multilayer film utilizing a conventional filler in the core layer, and utilizing the breathable film-forming composition of the invention in one or both skin layers.

It is also a feature and advantage of the invention to provide a breathable laminate in which the breathable film of the invention is laminated to a nonwoven web.

It is also a feature and advantage of the invention to provide a breathable garment, such as a breathable diaper or surgical gown, which utilizes the breathable film of the invention in a laminate.

The foregoing and other features and advantages will become further apparent from the following detailed description of the presently preferred embodiments, read in conjunction with the accompanying drawings. The detailed description and drawings are intended to be illustrative rather than limiting, the scope of the invention being defined by the appended claims and equivalents thereof.

TEST PROCEDURE

The following procedure is described for testing of the moisture vapor transmission rate (MVTR) for the breathable films of the invention. The MVTR is measured in a manner similar to ASTM Standard Test Method for Water Vapor Transmission of Materials, Designation E-96-80 as follows. For the purposes of the present invention, 3 inch diameter (76 mm) circular samples are cut from the test material and from a control material, CELGUARD® 2500 (Hoechst Celanese Corporation). CELGUARD® 2500 is a 0.0025 cm thick film composed of microporous polypropylene. Two or three samples are prepared for each material.

The cups used for testing are cast aluminum, flanged, 2 inches deep and come with a mechanical seal and neoprene gasket. The cups are distributed by Thwing-Albert Instrument Company, Philadelphia, Pa., under the designation Vapometer cup #681. One hundred millimeters of distilled water is poured into each Vapometer cup, and each of the individual samples of the test materials and control material are placed across the top area of an individual cup. Screw-on flanges are tightened to form a seal along the edges of the cups leaving the associated test material or control material exposed to the ambient atmosphere over a 62 millimeter diameter circular area (an open, exposed area of about 30 cm$^2$). The cups are then weighed, placed on a tray, and set in a forced air oven set at 100° F. (38° C.).

The oven is a constant temperature oven with external air through it to prevent water vapor accumulation inside. A suitable forced air oven is, for example, a Blue M Power-O-Matic 60 oven distributed by Blue M Electric Co. of Blue Island, Ill. After 24 hours, the cups are removed from the oven and weighed. The preliminary test MVTR value is calculated as follows:

Test MVTR=[(grams weight loss over 24 hours)×7571]÷24

The relative humidity within the oven is not specifically controlled. Under predetermined set conditions of 100° F. and ambient relative humidity, the MVTR for CELGUARD® 2500 has been determined to be 5000 g/m$^2$/24 hours. Accordingly, CELGUARD® 2500 is run as a control sample with each test and the resulting values are corrected in accord with the variation of the control relative to its known MVTR.

DETAILED DESCRIPTION OF THE PRESENTLY PREFERRED EMBODIMENTS

Figure 1:
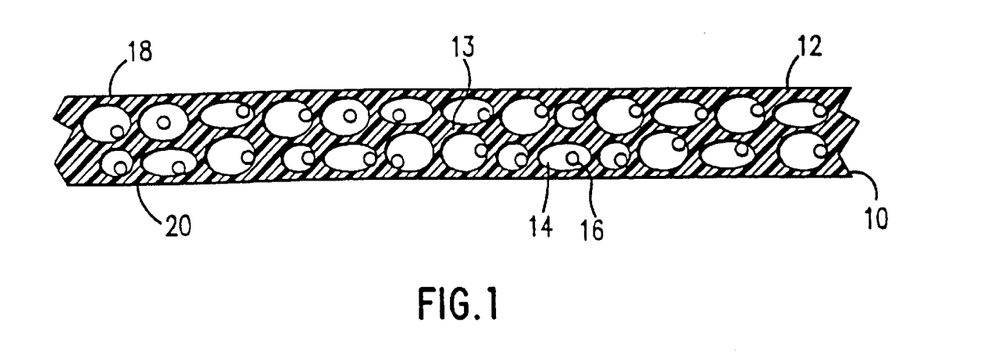
FIG. 1 is a sectional view of a single layer breathable film of the invention, utilizing organic filler particles and a compatibilizer in a stretched polymer matrix.

Referring to FIG. 1, a breathable monolayer film 10 is shown including a matrix 12, a plurality of voids 14 within the matrix surrounded by relatively thin microporous membranes 13 defining tortuous paths, and one or more organic filler particles 16 in each void 14. The film 10 is microporous as well as breathable, and the microporous membranes 13 between the voids readily permit molecular diffusion of water vapor from a first surface 18 to a second surface 20 of the film layer 10.

The matrix 12 can include any suitable film-forming matrix polymer. Examples of suitable matrix polymers include without limitation polyethylene, polypropylene, copolymers of mainly ethylene and $C_3$–$C_{12}$ alpha-olefins (commonly known as linear low density polyethylene), copolymers of mainly propylene with ethylene and/or $C_4$–$C_{12}$ alpha-olefins, and flexible polyolefins including propylene-based polymers having both atactic and isotactic propylene groups in the main polypropylene chain. Other suitable matrix polymers include without limitation elastomers, for example polyurethanes, copolyether esters, polyamide polyether block copolymers, ethylene methyl acrylate, ethylene ethyl acrylate, and ethylene vinyl acetate copolymers, and combinations of the foregoing. Metallocene-catalyzed polyolefins are useful, including those described in U.S. Pat. Nos. 5,571,619, 5,322,728, and 5,272,236, the disclosures of which are incorporated herein by reference.

Polymers made using metallocene catalysts have a very narrow molecular weight range. Polydispersity numbers (Mw/Mn) of below 4 and even below 2 are possible for metallocene-produced polymers. These polymers also have a controlled short chain branching distribution compared to otherwise similar Ziegler-Natta produced type polymers. It is also possible using a metallocene catalyst system to control the isotacticity of the polymer quite closely.

Commercial production of metallocene polymers is somewhat limited but growing. Such polymers are available from Exxon Chemical Company of Baytown, Tex. under the trade name ACHIEVE® for polypropylene based polymers and EXACT® and EXCEED® for polyethylene based polymers. Dow Chemical Company of Midland, Mich. has polymers commercially available under the name ENGAGE®. These materials are believed to be produced using non-stereo selective metallocene catalysts. Exxon generally refers to their metallocene catalyst technology as "single site" catalyst while Dow refers to theirs as "constrained geometry" catalysts under the name INSIGHT® to distinguish them from traditional Ziegler-Natta catalysts which have multiple reaction sites. Other manufacturers such as Fina Oil, BASF, Amoco, Hoechst and Mobil are active in this area and it is believed that the availability of polymers produced according to this technology will grow substantially in the next decade. In the practice of the instant invention, elastic polyolefins like polypropylene and polyethylene are preferred, most especially elastic polypropylene.

The matrix polymer should constitute about 20–95% by weight of the breathable monolayer film 10, preferably about 30–85% by weight, most preferably about 40–75% by weight. In addition to one or more of the polymers listed above, the matrix may include a compatibilizing system as described below if the compatibilizing system is incorporated into the matrix, and the foregoing percentages are for the matrix polymer without the compatibilizing system.

The organic filler particles 16 can include any suitable organic filler material which has a high enough melting or softening point to permit the filler particles to remain substantially undeformed due to the heating and stretching of the film 10. If the filler particles liquefy and flow, or significantly deform during heating and stretching of the film, the particles may not sufficiently pull away from the matrix polymer to allow void formation as needed to render the film 10 breathable to water vapor. Thus, the proper selection of the filler material will depend partly on the matrix polymer and the temperature required to stretch the matrix 12.

As explained above, the filler material must also be sufficiently incompatible with the matrix polymer to discourage or prevent dissolution or excessive dispersion of the filler particles in the matrix polymer. For purposes of the invention, the filler particles 16 should have a steady state mean particle diameter of about 0.1–25 microns, preferably about 0.5–10 microns, most preferably about 0.8–3 microns. "Steady state mean particle diameter" means that the filler particles achieve thermodynamic equilibrium in the matrix within that size range. While some agglomeration, dispersion or dissolution of the particles may occur, especially when the matrix polymer is molten, these factors offset each other to maintain a mean particle diameter within the stated ranges. If the filler particles dissolve in the polymer matrix, or break down and disperse to the point of becoming too small, they will not be effective in causing void formation during stretching of the film 10.

The filler particles 16 may be thermoplastic or thermoset. One advantage of using thermoset filler particles is that they cannot dissolve or divide in the matrix polymer due to their internal crosslinking. The filler particles 16 may also be thermoplastic, provided that they do not dissolve, excessively divide and disperse, or significantly deform during stretching as explained above. Examples of organic filler particles that may be used include particles made of polystyrene, polyamides, polyvinyl alcohol, polyethylene oxide, polyethylene terephthalate, polybutylene terephthalate, polycarbonate, polytetrafluoroethylene, and other suitable polymers and derivatives thereof. Preferred filler particles include polystyrenes and high impact polystyrenes (HIP's). The filler particles 16 may also be made of water-swellable organic materials.

By "water-swellable" it is meant that the particles must be capable of absorbing at least about 10 times their weight, preferably at least about 20 times their weight, most preferably at least about 30 times their weight, in distilled water. Examples of organic water-swellable fillers include without limitation natural and synthetic superabsorbent materials. Natural superabsorbent materials include guar gum, agar, pectin and the like. Synthetic superabsorbent materials include hydrogel polymers such as alkali metal salts of polyacrylic acids, polyacrylamides, polyvinyl alcohol, ethylene-maleic anhydride copolymers, polyvinyl ethers, methyl cellulose, carboxymethyl cellulose, hydroxypropylcellulose, polyvinylmorpholinone, and polymers and copolymers of vinyl sulfonic acid, polyacrylates, polyacrylamides, polyvinylpyrridine, and the like. Other suitable polymers include hydrolyzed acrylonitrile grafted starch, acrylic acid grafted starch, and isobutylene maleic anhydride polymers and mixtures thereof. The hydrogel polymers are preferably lightly crosslinked to render the materials substantially water insoluble. Crosslinking may, for example, be accomplished by irradiation or by covalent, ionic, van der Waals, or hydrogen bonding.

The filler content and degree of stretching affect the number of voids and the nature of the tortuous paths between the voids. The total filler content should range from about 1–70% by weight of the total composition (filler plus matrix), preferably about 5–60% by weight of the total composition, most preferably about 10–40% by weight of the total composition. The filler may comprise a mixture of different filler particles (e.g., made from different materials). The filler particles may also include a compatibilizer (described below). If so, these percentages are for the filler without the compatibilizer.

The film may be uniaxially or biaxially stretched. The film may be uniaxially stretched to about 1.1–7.0 times its original length, preferably to about 1.5–6.0 times its original length, most preferably to about 2.5–5.0 times its original length. The film may alternatively be biaxially stretched using conventional techniques familiar to persons skilled in the art.

Using an organic filler which is incompatible with the matrix polymer has an advantage in that the filler particles 16 will not dissolve or break down to an ineffective size. Unfortunately, the organic filler particles in an incompatible polymer medium tend to do just the opposite, which is to agglomerate together into larger particles having substantially larger sizes. The larger particles are ineffective because there is too little (as opposed to too much) dispersion in the matrix polymer. Large particles can cause undesirable tearing and pinholing of the film during stretching, destroying the liquid barrier properties of the film 10. In the past, this agglomeration into large particles has made it difficult to use organic filler particles to make breathable films.

In accordance with the invention, a compatibilizing system is incorporated into the matrix 12 and blended with the matrix polymer, or is incorporated into the filler particles, or both. The compatibilizing system lessens the incompatibility and, to a limited extent, increases the compatibility between the matrix polymer and the organic filler particles 16. To serve its purpose, the compatibilizing system must be of a proper type and amount which achieves thermodynamic equilibrium of the filler particles in a dispersed state in the polymer matrix, and in the size ranges (noted above) which are effective for creating a breathable stretched film. In other words, the compatibilizing system must create a thermodynamic balance between agglomeration and dispersion such that the filler particles neither agglomerate nor disperse to an extent which places them outside of the useful size ranges.

The type and amount of compatibilizing system required to achieve this effect will vary widely depending on the matrix polymer, the filler polymer and amount, the stretching conditions and temperature, and other factors. It has been discovered that a particular compatibilizing system, used in a proper amount, can create the necessary thermodynamic equilibrium between a polyolefin-based matrix polymer and a polystyrene-based particulate filler. This compatibilizer system includes a copolymer, terpolymer or other multipolymer of styrene and one or more alpha-olefin monomers having 3–20 carbon atoms, preferably 3–5 carbon atoms.

Various copolymers are effective for compatibilizing polystyrene particulate filler with a polyolefin matrix. Suitable copolymers include without limitation styrene-butadiene and styrene-ethylene butadiene diblock resins available under the trade name VECTOR® from Dexco Corporation. Also included are styrene-ethylene butadiene-styrene triblock resins, as well as styrene-ethylene resins and styrene-ethylene propylene resins, available under the trade name KRATON® from Shell Chemical Co. Also included are styrene-styrene butadiene-butadiene-styrene butadiene-styrene tapered multiblock resins available under the trade name STEREON® from the Firestone Company. Derivatives of these and other multipolymers, including without limitation hydrogenated derivatives, are also useful in the compatibilizing system.

The amount of the compatibilizing system present in the composition is also important. If the level of compatibilizer is too low, its effectiveness in reducing agglomeration of the polystyrene will be diminished. If the amount of compatibilizer is too high, it may over-compatibilize the polystyrene filler, causing excessive dispersion and particle breakdown. The optimum amount of the compatibilizer will depend somewhat on the level of filler in the film, and on the level and type of polyolefin. Table 1 summarizes the presently preferred levels of the matrix polymer, filler, and compatibilizer, expressed as percentages based on the weight of the composition used to make the monolayer film 10.

TABLE 1

| Component | General % Range | Preferred % Range | Most Preferred % Range |
| --- | --- | --- | --- |
| Matrix Polymer | 20–95 | 30–85 | 40–75 |
| Organic Filler | 1–70 | 5–60 | 10–50 |
| Compatibilizer | 1–40 | 3–20 | 5–10 |

The compatibilizer in the composition may be blended into the matrix polymer, or included in the filler particles, or both. For ease of manufacture, it is preferred to blend the compatibilizer with the matrix polymer. The matrix polymer preferably includes a polyolefin. Preferred polyolefins include polyethylenes, polypropylenes, copolymers of ethylene or propylene with a $C_3$–$C_{20}$ alpha-olefin, and blends containing any of the foregoing. When the matrix polymer is polyethylene, it may contain high density polyethylene, low density polyethylene, linear low density polyethylene, or a blend thereof. Linear low density polyethylene, conventional (branched) low density polyethylene, and polypropylene (homopolymers and copolymers) are most preferred.

The monolayer film 10 should have a thickness which facilitates breathability to water vapor, and which also permits structural integrity and liquid barrier. After stretching, the film 10 should have a thickness of about 5–50 microns, preferably about 8–30 microns, most preferably about 10–20 microns. Prior to the orientation, the film 10 can be prepared using cast or blown film extrusion, or another suitable film-forming technique. By using the organic filler particles, the film 10 may be extruded as a monolayer film while avoiding the excessive die build-up associated with the extrusion of films containing inorganic fillers.

Figure 2:
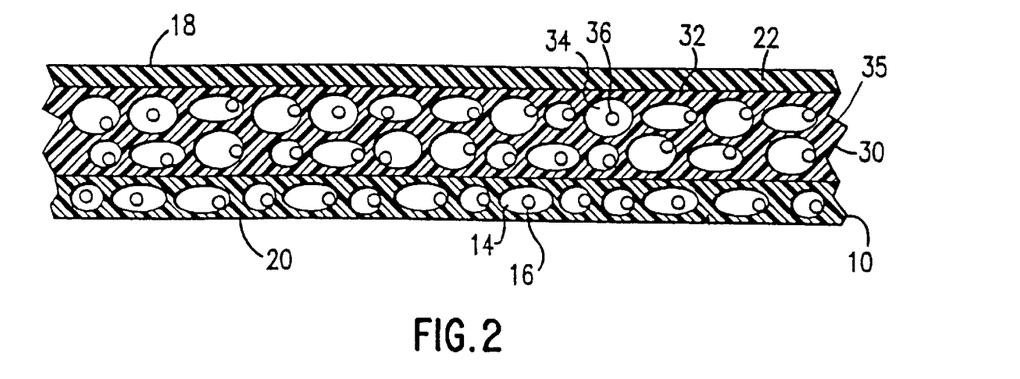
FIG. 2 is a sectional view of a multilayer breathable film of the invention.

FIG. 2 illustrates another embodiment in which a breathable film layer 10 containing organic filler particles 16 in voids 14, is employed as an outer layer of a multilayer film 30. The multilayer film 30 includes a core layer 35 constructed from an oriented polymer matrix 32 having voids 34 formed with the aid of inorganic void-initiating filler particles 36 in the voids. Suitable inorganic fillers include without limitation calcium carbonate, clays, silica, alumina, barium sulfate, sodium carbonate, talc, magnesium sulfate, titanium dioxide, zeolites, aluminum sulfate, diatomaceous earth, magnesium sulfate, magnesium carbonate, barium carbonate, kaolin, mica, carbon, calcium oxide, magnesium oxide, aluminum hydroxide and combinations of these particles. The mean diameter for the inorganic filler particles 36 should range from about 0.1–10 microns, preferably about 0.5–7.0 microns, most preferably about 0.8–2.0 microns.

The organic particles 16 and/or the inorganic particles 36 in the films of the invention may be coated with a minor quantity (e.g., up to 2% by weight) of a fatty acid or other material to ease their dispersion in the polymer matrix. Suitable fatty acids include without limitation stearic acid, or a larger chain fatty acid such as behenic acid.

Because the layer 35 contains inorganic filler particles, it is preferably surrounded by two outer layers which aid processing by alleviating filler build-up at the die lip. A first outer layer 22, positioned adjacent the core layer 35, is typical of a prior art approach. The layer 22 may include the same polymer as in the core matrix. The layer 22 is preferably constructed of a polymer having a similar or lower melting point than the core matrix polymer 32, in order to facilitate heat sealability of the film. The outer layer 22 is generally free or substantially free of filler, in order to alleviate die contamination. Finally, the layer 22 should be much thinner than the layer 35.

The thickness and composition of the outer layer 22 should be selected so as not to substantially impair the moisture transmission through the breathable core layer 35. This way, the breathable core layer 35 may determine the breathability of the entire film, and the outer layer 22 will not substantially reduce or block the breathability of the film. To this end, the skin layer 22 should be less than about 10 microns thick, preferably less than about 5 microns thick, most preferably less than about 2.5 microns thick. Preferred skin layer polymers include ethylene vinyl acetates, propylene vinyl acetates, ethylene methyl acrylates, other vapor-permeable polymers, and blends of these with other polyolefins.

In the prior art, the core layer 35 containing inorganic filler 36 would have been coated on both sides with layers such as layer 22, containing little or no filler. In accordance with the invention, one or both outer layers can instead be a breathable layer 10 containing organic filler 16. The breathable outer layer 10, like the layer 22 of the prior art, prevents the inorganic filler in the core layer from contaminating the die lip during extrusion.

The breathable layer 10 has the further advantage of promoting, and not interfering with, the overall breathability of the film 30. Thus, the breathable outer layer can be made thicker. Preferably, the breathable layers 10 containing organic filler will be placed on both sides of the core layer 35, so as to eliminate use of a prior art substantially filler-free layer on both sides. When this is done, there is no practical upper limit on the thicknesses of the breathable layers 10 relative to the total film thickness.

In a conventional multilayer film, the inorganic filler content in core layer 35 may range from about 10–70% by weight of the layer 35, preferably about 25–65% by weight, most preferably about 40–60% by weight. When the breathable layer 10 is used as an external layer as in FIG. 2, or as both external layers, the amount of inorganic filler 36 in the core layer may be the same or somewhat lower, preferably about 10–50% by weight of the core layer 30, most preferably about 15–30% by weight. In other words, the enhanced breathability resulting from the use of breathable outer layers 10 may be offset with a slightly reduced inorganic filler content, and slightly reduced breathability in the core layer 35. The matrix polymer used in the inorganic filler-containing layer 35 may be the same or different from that used in the organic filler-containing layer 10. The same types of matrix polymers are generally suitable for either layer.

Regardless of whether the breathable organic filler-containing layer 10 is a monolayer film or a constituent of a multilayer film, the overall film should be constructed to function as a breathable microporous film. To function properly, the overall film should have a moisture vapor transmission rate (MVTR) of at least about 300 grams/m²-24 hours measured using the procedure described above. Preferably, the overall film should have an MVTR of at least about 1200 grams/m²-24 hours, most preferably at least 2000 grams/m²-24 hours.

Figure 3:
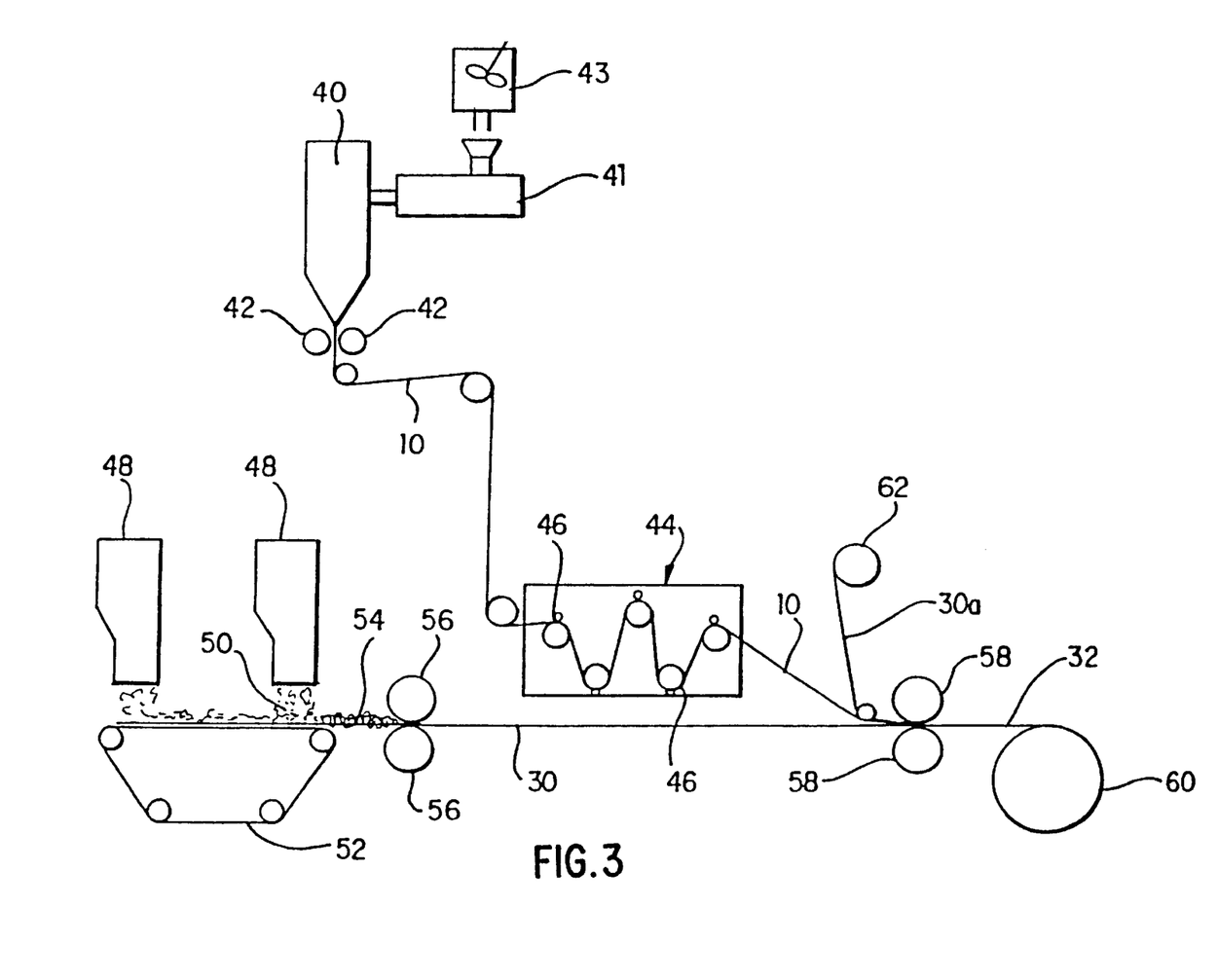
FIG. 3 schematically illustrates a process for laminating a breathable film of the invention to a nonwoven web.

FIG. 3 illustrates a process for forming a breathable microporous film or film layer. Referring to FIG. 3, film 10 is formed from a film extrusion apparatus 40 such as a cast or blown unit which could be in-line or off-line. Typically the apparatus 40 will include an extruder 41. Filled resin including the polymer matrix material, compatibilizer and filler is prepared in a mixer 43 and directed to extruder 41. The film 10 is extruded into a pair of nip or chill rollers 42, one of which may be patterned so as to impart an embossed pattern to the newly formed film 10.

From the film extrusion apparatus 40 or off-line rolls supplied, the filled film 10 is directed to a film stretching unit 44 which can be a machine direction orienter, commercially available from vendors including the Marshall and Williams Co. of Providence, R.I. Apparatus 44 has a plurality of pairs of stretching rollers 46, with each subsequent pair moving at progressively faster speed than the preceding pair. The rollers 46 apply an amount of stress and progressively stretch the filled film 10 to a stretched length where the film 10 becomes microporous and breathable. As shown, the film 10 is stretched only in the machine direction, which is the direction of travel of the film 10 through the process in FIG. 3.

Advantageously, the film 10 may be uniaxially stretched to about three times its original length, using an elevated stretch temperature of about 150–200° F. for most polyolefin-based films. The elevated stretch temperature can be sustained by heating some of the stretch rollers 46. The optimum stretch temperature varies with the type of matrix polymer in the film 10, and is always below the melting temperature of the matrix polymer.

Figure 4:
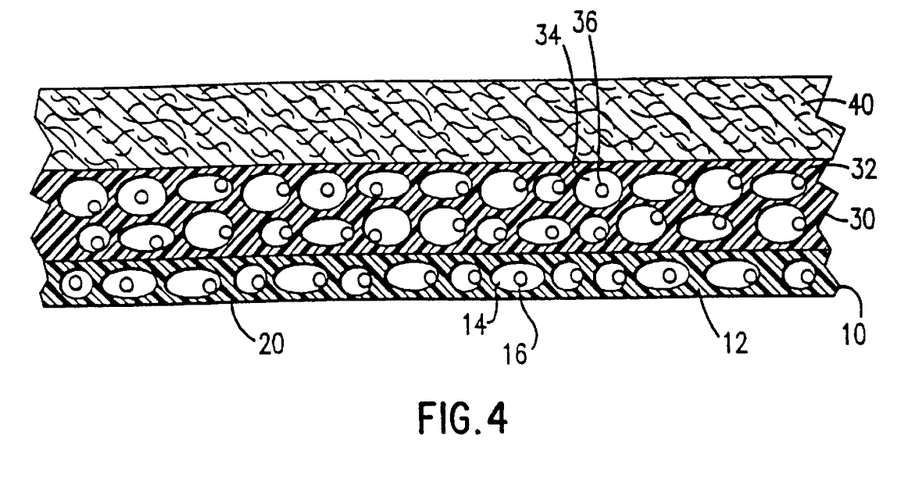
FIGS. 4 and 5 illustrate two embodiments of laminates including a breathable film of the invention and a nonwoven web.
Figure 5:
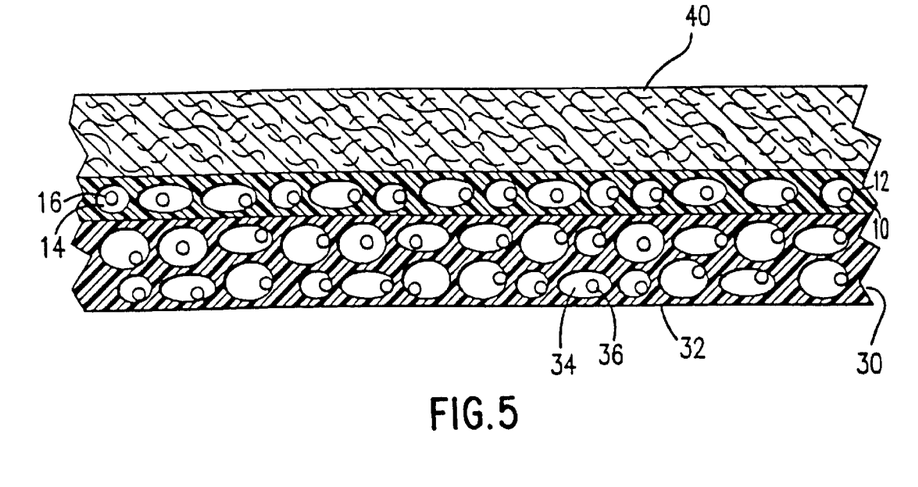

The breathable film may be laminated to one or more substrates, such as a nonwoven web, using conventional adhesive bonding or thermal bonding techniques known in the art. The type of substrate and bonding will vary depending on the particular end use application. An example of a laminate is shown in FIG. 4, wherein a nonwoven web 40 is laminated to a two-layer breathable film of the invention. In the embodiment shown, the web 40, which can be a spun-bonded web of polypropylene or polyethylene, is bonded to the voided film layer 32 of the multilayer film 30, which layer contains inorganic filler particles. The organic filler-containing layer 10 faces away from the nonwoven web 40. In one embodiment of a diaper, the organic filler-containing layer 10 can face inward toward the absorbent core while the nonwoven layer 40 would be exposed on the outside of the diaper. In still a further embodiment and in reference to FIG. 5, the organic filler-containing layer is a heat seal layer, and is adjacent the nonwoven web 40. In either case, when the laminate is used as a diaper backing, the nonwoven web 40 will preferably face away from the absorbent core of the diaper.

Referring again to FIG. 3, the film 10 may be laminated to nonwoven web 30 immediately after the film is stretched and immediately following manufacture of the nonwoven web. The nonwoven web 30 can be a spunbonded web, a meltblown web, a bonded carded web, or combination thereof. The web can be formed by dispensing polymer filaments 50 from a pair of conventional spinnerettes 48, onto a conveyor assembly 52. The filaments 50 are deposited onto the conveyor to form mat 54. The filaments 50 of mat 54 are then compressed to form inter-filament bonding using a pair of nip rollers 56, resulting in the spunbonded web 30. The spunbonded web 30 is then transported to the calender bonding rollers 58 and is thermally bonded to one side of the film 10. The film 10 in FIG. 3 is simultaneously bonded on its other side to a second material 30a originating from a supply roll 62. The second material 30a may be a second nonwoven web, or another film layer. The resulting laminate 32 is wound and stored onto a supply roll 60.

Other examples of laminates and end uses in which the self-regulating film may be useful are described in various patents and patent applications assigned to Kimberly-Clark Worldwide, Inc. These include without limitation U.S. application Ser. No. 08/359,986, filed Dec. 20, 1994 now abandoned; U.S. application Ser. No. 08/755,692, filed Nov. 25, 1996 U.S. Pat. No. 5,695,868; and U.S. application Ser. No. 08/777,365, filed Dec. 27, 1996 U.S. Pat. No. 6,037,281. These patent applications are incorporated herein by reference in their entirety.

While the embodiments of the invention disclosed herein are presently considered preferred, various modifications and improvements can be made without departing from the spirit and scope of the invention. The scope of the invention is indicated by the appended claims, and all changes that fall within the meaning and range of equivalency are intended to be embraced therein.

We claim:

1. A breathable microporous film having an MVTR of at least about 1200 grams/m²-24 hours, the film comprising a film-forming composition including:

about 20–95% by weight of a matrix polymer;

about 1–70% by weight of organic filler particles incompatible with the matrix polymer; and about 1–40% by weight of a compatibilizer;

the organic filler particles having a tendency to agglomerate in a medium containing only the organic filler and the matrix polymer; and the compatibilizer establishing thermodynamic equilibrium between the organic filler and matrix polymer such that the organic filler has a steady state mean particle diameter of about 0.1–25 microns in the film-forming composition;

the organic filler particles being surrounded by a plurality of voids within the matrix polymer, the voids being bounded by polymer membranes which permit diffusion of water vapor through the film.

2. The breathable film of claim 1, wherein the film-forming composition comprises:
   about 30–85% by weight of the matrix polymer;
   about 5–60% by weight of the organic filler; and
   about 3–20% by weight of the compatibilizer.

3. The breathable film of claim 1, wherein the film-forming composition comprises:
   about 40–75% by weight of the matrix polymer;
   about 10–50% by weight of the organic filler; and
   about 5–10% by weight of the compatibilizer.

4. The breathable film of claim 1, wherein the organic filler has a steady state mean particle diameter of about 0.5–10 microns.

5. The breathable film of claim 1, wherein the organic filler has a steady state mean particle diameter of about 0.8–3 microns.

6. The breathable film of claim 1, wherein the matrix polymer comprises a material selected from the group consisting of polyethylene, polypropylene, copolymers of ethylene and $C_3$–$C_{12}$ alpha-olefins, copolymers of propylene with $C_2$ and/or $C_4$–$C_{12}$ alpha-olefins, propylene-based polymers having atactic and isotactic groups, polyurethanes, copolyether esters, polyamide polyether block copolymers, ethylene methyl acrylate, ethylene ethyl acrylate, ethylene vinyl acetate, and combinations thereof.

7. The breathable film of claim 6, wherein the organic filler comprises a polystyrene-based material.

8. The breathable film of claim 7, wherein the compatibilizer comprises a multipolymer of styrene and one or more alpha-olefin monomers having 3–20 carbon atoms.

9. The breathable film of claim 8, wherein the compatibilizer comprises a multipolymer of styrene and one or more alpha-olefin monomers having 3–5 carbon atoms.

10. The breathable film of claim 9, wherein the compatibilizer comprises a multipolymer selected from the group consisting of styrene-butadiene copolymers, styrene-ethylene butadiene terpolymers, styrene-ethylene butadiene-styrene terpolymers, styrene-ethylene copolymers, styrene-ethylene propylene terpolymers, styrene-styrene butadiene-butadiene-styrene butadiene-styrene multipolymers, hydrogenated derivatives thereof, and combinations thereof.

11. The breathable film of claim 1, having an MVTR of at least about 2000 grams/$m^2$-24 hours.

12. A breathable film having an MVTR of at least about 1200 grams/$m^2$-24 hours, comprising:
   a first microporous breathable layer including about 30–90% by weight of a first matrix polymer and about 10–70% by weight of inorganic filler particles; and
   a second breathable layer on a first side of the first breathable layer, including about 20–95% by weight of a second matrix polymer, about 1–70% by weight of organic filler particles incompatible with the second matrix polymer, and about 1–40% by weight of a compatibilizer;
   the inorganic and organic filler particles being surrounded by a plurality of voids within the respective first and second matrix polymers, the voids being bounded by polymer membranes which permit diffusion of water vapor through the film.

13. The breathable film of claim 12, further comprising a third breathable layer on a second side of the first breathable layer, including about 20–95% by weight of a third matrix polymer, about 1–70% by weight of an organic particulate filler incompatible with the third matrix polymer, and a compatibilizer.

14. The breathable film of claim 12, wherein the first and second matrix polymers each comprise a material selected from the group consisting of polyethylene, polypropylene, copolymers with ethylene with $C_3$–$C_{12}$ alpha-olefins, copolymers of propylene with $C_2$ and/or $C_4$–$C_{12}$ alpha-olefins, propylene-based polymers having atactic and isotactic groups, polyurethanes, copolyether esters, polyamide polyether block copolymers, ethylene methyl acrylate, ethylene ethyl acrylate, ethylene vinyl acetate, and combinations thereof.

15. The breathable film of claim 12, wherein the inorganic filler comprises a material selected from the group consisting of calcium carbonate, clays, silica, alumina, barium sulfate, sodium carbonate, talc, titanium dioxide, zeolites, aluminum sulfate, diatomaceous earth, magnesium sulfate, magnesium carbonate, kaolin, mica, carbon, calcium oxide, magnesium oxide, aluminum hydroxide, and combinations thereof.

16. The breathable film of claim 12, wherein the organic filler comprises a material selected from the group consisting of polystyrene, polyamides, polyvinyl alcohol, polyethylene oxide, polyethylene terephthalate, polybutylene terephthalate, polycarbonate, polytetrafluoroethylene, derivatives thereof, and combinations thereof.

17. The breathable film of claim 14, wherein the organic filler comprises a polystyrene-based material.

18. The breathable film of claim 17, wherein the compatibilizer comprises a multipolymer of styrene and one or more alpha-olefin monomers having 3–20 carbon atoms.

19. The breathable film of claim 17, wherein the compatibilizer comprises a multipolymer of styrene and one or more alpha-olefin monomers having 3–5 carbon atoms.

20. The breathable film of claim 12, wherein the organic filler has a steady state mean particle diameter of about 0.5–10 microns.

21. The breathable film of claim 12, wherein the organic filler has a steady state mean particle diameter of about 0.8–3 microns.

22. A breathable laminate, comprising:
   a nonwoven web; and
   a breathable film having an MVTR of at least about 1200 grams/$m^2$-24 hrs., laminated to the nonwoven web;
   the film having a layer which includes about 20–95% by weight of a matrix polymer, about 1–70% by weight of organic filler particles incompatible with the matrix polymer, and about 1–40% of a compatibilizer;
   the organic filler particles being surrounded by a plurality of voids within the matrix polymer, the voids being bounded by polymer membranes which permit diffusion of water vapor through the film.

23. The breathable laminate of claim 22, wherein the nonwoven web comprises a material selected from a spunbonded web, a meltblown web, a bonded carded web, and combinations thereof.

24. The breathable laminate of claim 22, wherein the nonwoven web comprises a spunbonded web.

25. The breathable laminate of claim 22, wherein the nonwoven web comprises a polyolefin.

26. The breathable laminate of claim 22, wherein the matrix polymer comprises a polyolefin.

27. The breathable laminate of claim 22, wherein the organic particulate filler comprises polystyrene.

28. The breathable laminate of claim 26, wherein the organic particulate filler comprises polystyrene.

29. The breathable laminate of claim 27, wherein the compatibilizer comprises a styrene-alpha-olefin multipolymer.

30. The breathable laminate of claim 28, wherein the compatibilizer comprises a styrene-alpha-olefin multipolymer.

* * * * *